June 21, 1932.  J. W. SHIELDS  1,864,150
MOTOR INSULATOR
Filed Aug. 9, 1930
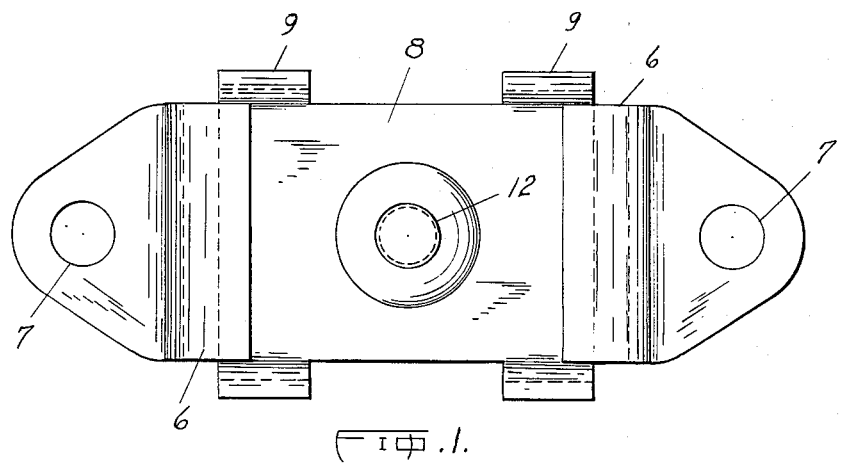
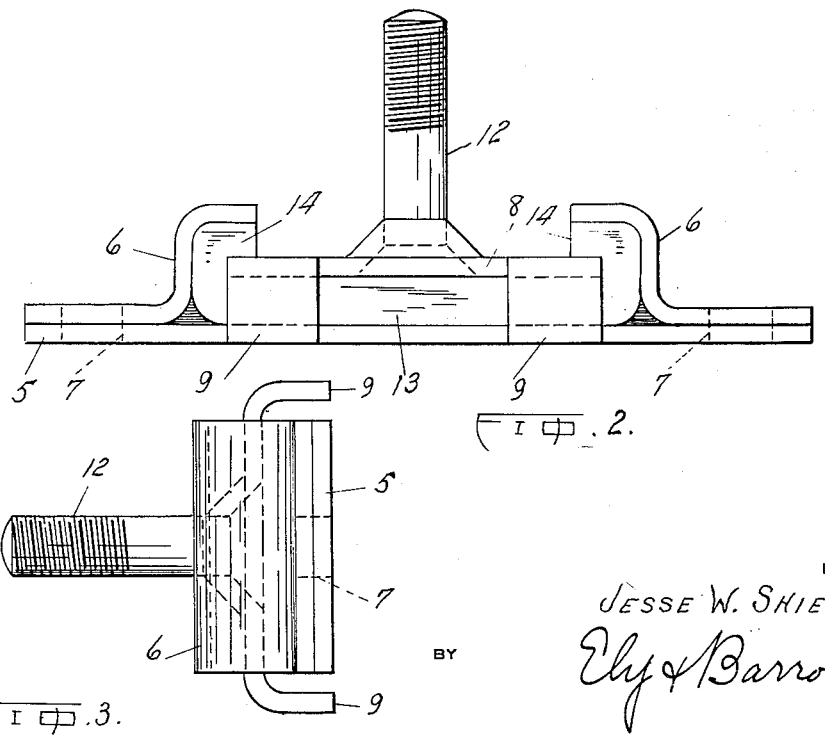
INVENTOR
JESSE W. SHIELDS.
BY Ely & Barrow
ATTORNEYS.

Patented June 21, 1932

1,864,150

UNITED STATES PATENT OFFICE

JESSE W. SHIELDS, OF AKRON, OHIO, ASSIGNOR TO THE FIRESTONE TIRE & RUBBER COMPANY, OF AKRON, OHIO, A CORPORATION OF OHIO

MOTOR INSULATOR

Application filed August 9, 1930. Serial No. 474,292.

This invention relates to motor insulators or similar shock and vibration absorbing devices.

The general object of the invention resides in the provision of an inexpensive, efficient shock and vibration insulator.

A more particular object of the invention is to provide an insulator adapted for motor boat installations and which is formed with interlocking plates which prevent let-go upon failure of the rubber therebetween and which interlocking portions serve as stops to limit the resilient movement of the respective plates.

The above and other objects of the invention are achieved by the device illustrated in the accompanying drawing and described below, it being understood that the invention is not limited to the exact details shown and described.

In the drawing:

Figure 1 is a side elevation of the insulator embodying the invention.

Figure 2 is a bottom plan view of the insulator of Figure 1.

Figure 3 is an end elevation of the insulator of Figure 1.

The shock or motor insulator embodying the invention includes a plate 5 upon which are bent, welded or otherwise formed or secured flange-like brackets 6. The ends of the plate and flange brackets are apertured as at 7 for the reception of suitable fastening means (not shown) whereby the plate is secured to one of the members (not shown) to be insulated.

The numeral 8 indicates the other plate of the insulator, it being formed with a plurality of bent side flanges 9 and a central recess through which extends a bolt 12 by which the plate 8 can be secured to the other of the parts to be insulated.

Vulcanized to and between the plates 5 and 8 is a rubber pad 13, the ends of which extend around and over the ends of the plate 8 and under the flange-brackets 6 as at 14.

The metal portions of the insulator which contact with the rubber should be of a suitable metal or should be suitably plated or coated to secure a tight weld between the rubber and the metal.

In operation the insulator is preferably used on its side and the plate 8 is preferably secured, by the bolt 12, to the motor. It will thus be seen that the rubber will be in shear between the plates 5 and 8 and that the flanges 9 serve to positively limit the relative movement of the plates in a vertical direction. The bracket-flanges 6 act to limit both longitudinal and lateral movement between the plates. If the rubber should fail, the interlocked plates will prevent a let-go between the plates. In lateral and longitudinal shocks between the insulated parts, a portion of the rubber will be in tension and a portion in compression as will be evident.

As many changes could be made in this construction it is intended that all matter contained in the above description or shown in the accompanying drawing shall be interpreted as illustrative only and not in a limiting sense, accordingly various modifications and applications of the invention can be resorted to without departing from the spirit of the invention or the scope of the appended claims.

What is claimed is:

1. A shock insulator comprising a plate, a pair of flanges on said plate in parallel relation therewith, a second plate carried between said flanges and said first-named plate, side flanges on said second plate spaced from the edges of the first-named plate and serving as stops for the relative movement between the plates, and a rubber pad vulcanized to and between the plates and to and between the flanges on the first-named plate and the second plate.

2. A shock insulator comprising a plate, a pair of flanges on said plate in parallel relation therewith, a second plate carried between said flanges and said first-named plate, side flanges on said second plate spaced from the edges of the first-named plate and serving as stops for the relative movement between the plates, and a rubber pad vulcanized to and between the plates.

JESSE W. SHIELDS.